Patented Dec. 4, 1934

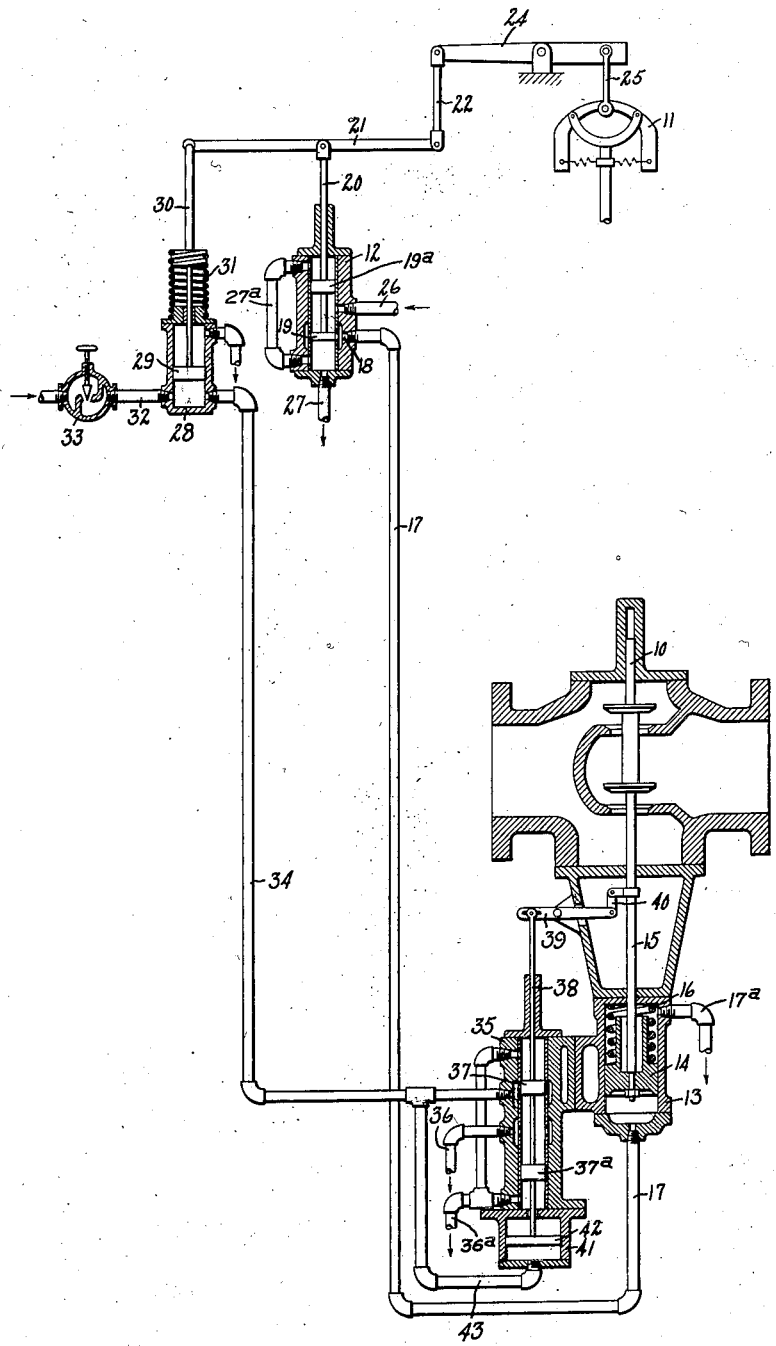

1,983,385

UNITED STATES PATENT OFFICE 1,983,385

HYDRAULIC CONTROL SYSTEM

R. Wayne McLaughlin, Scotia, N. Y., assignor to General Electric Company, a corporation of New York Application May 16, 1934, Serial No. 725,949

3 Claims. (Cl. 121—42)

The present invention relates to control systems in which the transfer of a movement of an element, which may be termed a regulating element, to another element which may be termed a regulated or controlled element, is effected by hydro-mechanical means. Such hydro-mechanical means are advantageous where the regulating element is located at a considerable distance away from the regulated element. The usual form of control mechanism of this kind comprises a control member or pilot valve mechanically connected to the regulating element such as the speed governor of an elastic fluid turbine. The control member controls a motor such as a hydraulic motor mechanically connected to the regulated element which in the case of a turbine may be a valve for controlling the flow of elastic fluid to the turbine. Hydro-mechanical means are provided for restoring the control member or pilot valve to its original position, which means may comprise an auxiliary valve mechanically connected to the hydraulic motor for operating a pressure cylinder connected to the control member or pilot valve.

The object of my invention is to provide an improved arrangement of this kind of mechanism whereby the restoring of the control member or pilot valve is considerably accelerated.

For a consideration of what I believe to be novel and my invention, attention is directed to the following description and the claims appended thereto, in connection with the accompanying drawing which forms a part of my specification.

In the drawing I have shown by way of example a preferred embodiment in which an inlet or control valve, which may serve to control the admission of elastic fluid to an elastic fluid engine, is moved in response to speed changes.

The arrangement shown in the drawing comprises a control valve 10 representing broadly a regulated element and a speed governor 11 representing broadly a regulating element. The speed governor 11 may be provided at a considerable distance away from the control valve 10. Movement of the latter in response to speed changes is accomplished by a control member or pilot valve 12 connected to the governor and a hydraulic motor 13 having a piston 14 with a stem 15 connected to the stem of the valve 10. The piston 14 is biased in downward direction by a spring 16. Oil is admitted to a chamber defined by the lower portion of the hydraulic motor cylinder through a conduit 17 connected between the hydraulic motor cylinder and a port 18 of the pilot valve 12. Oil leaking past the piston 14 is drained from the upper part of the cylinder through a drain pipe 17a. A valve head 19 which normally covers the port 18 is connected to a stem 20 together with another head 19a for balancing the fluid pressure exerted on the head 19. The stem 20 is pivoted to a floating lever 21 whose right-hand end is connected by a link 22 to the left-hand end of a fulcrumed lever 24. The latter has its right-hand end connected by a link 25 to the speed governor. Oil or like actuating fluid under pressure is conducted to the pilot valve 12 through a supply conduit 26. Oil may be discharged from the pilot valve through a drain conduit 27. Leakage oil passing the head 19a is drained through a by-pass 27a and the drain conduit 27. During operation an increase in speed causes outward movement of the flyweights of the speed governor 11 whereby the fulcrumed lever 24 is turned in clockwise direction and causes through the link 22 and the floating lever 21 upward movement of the pilot valve head 19. The latter thereby uncovers the port 18 and permits oil to be drained from the cylinder of the hydraulic motor 13. This effects downward movement of the piston 14 under action of the biasing spring 16, resulting in closing movement of the control valve 10.

The pilot valve head 19 is restored to its original position by hydraulic means including a pressure cylinder 28 having a piston 29 with a stem 30 connected to the lefthand end of the floating lever 21 and biased in downward direction by a tension spring 31. The floating lever permits the valve head 19 to assume its line in line position with the port 18 in any position of the piston 29 in the pressure cylinder 28. Actuating fluid, such as oil, is conducted to the pressure cylinder 28 by a conduit 32 including an adjustable needle valve 33. Oil is discharged from the pressure cylinder through a conduit 34 which latter includes a valve 35 with a discharge conduit 36. The valve has been shown in the form of a pilot valve with a valve head 37 normally partly uncovering a port connecting with the conduit 34. The head 37 together with a balancing head 37a is fastened to a stem 38 which is pivoted to the left-hand end of a fulcrumed lever 39. The right-hand end of the lever 39 is connected by a link 40 to the stem 15 of the hydraulic motor. Actuating fluid leaking past the heads 37 and 37a is drained through a drain conduit 36a.

During normal operating conditions, a constant flow is maintained through the pressure cylinder 28, the conduit 34 and the valve 35. This flow is varied in response to piston movement of the hydraulic motor to cause restoring of the pilot valve position. In the above mentioned example an increasing speed caused upward movement of the pilot valve head 19 and downward movement of the hydraulic cylinder piston 14. This downward movement of the piston 14 effects through the link 40 and the fulcrumed lever 39 upward movement of the valve head 37 whereby the latter uncovers its port further, permitting an increased flow of fluid through the conduit 34 to the discharge conduit 36. This increased flow effects a drop in pressure in the pressure cylinder 28 whereby the piston 29 is forced downward under action of the spring 31, resulting in downward movement of the valve head 19 of the pilot valve 12. The valve head 19 thereby resumes its original position. The valve 35, which may be termed an auxiliary valve, is in substance a means for varying the hydraulic resistance of conduit 34 in response to movement of the hydraulic motor 13.

The restoring of the original position of the pilot valve or control member in the arrangement just described is comparatively slow, especially when the actuating fluid supplied to the pressure cylinder as well as to the pilot valve and the hydraulic motor is derived from the same source. The slow restoring action in many cases is undesirable. To overcome this, I provide in accordance with my invention means for accelerating the restoring of the pilot valve or control member to its original position in response to movement of the hydraulic motor. This is accomplished in the present instance by the provision of a modulating cylinder 41 accommodating a piston 42 which is fastened to the lower end of the stem 38 of the auxiliary valve 35. The lower cylinder portion defines a chamber for containing actuating fluid, communicating with the conduit 34 through a conduit 43. As pointed out above, increasing speed causes closing movement of the valve 10 and at the same time upward movement of the auxiliary valve head 37 to permit an increased flow in conduit 34 through the auxiliary valve 35. This action now is accelerated in that upward movement of valve head 37 causes simultaneously a similar movement of piston 42 of the modulating cylinder, permitting displacement of fluid from the conduit 34 into the cylinder 41. Thus, the conduit 43 may be considered a bypass with respect to the auxiliary valve 35. It will be readily seen that the displacement of fluid from conduit 34 into the modulating cylinder 41 accelerates the drop of pressure in the pressure cylinder 28, thereby effecting an accelerated restoring action of the control member or pilot valve 12.

A decrease in speed causes the flyweights of the speed governor to move inward, thereby effecting counter-clockwise turning of the fulcrumed lever 24 and downward movement of the valve head 19 of the pilot valve 12. This permits oil to be supplied from the conduit 26 through the conduit 17 into the hydraulic motor 13. The motor piston 14 with its stem 15 thereby moves upward to open the control valve 10. The upward movement of the stem 15 of the piston 14 causes downward movement of the valve head 37 of the auxiliary valve 35 whereby the resistance to flow through conduit 34 is increased. This resistance is further increased by the resulting downward movement of the piston 42 in the modulating cylinder, which movement effects the displacement of fluid from the modulating cylinder through the conduit 43 into the conduit 34, resulting in a rapid building-up of pressure in the pressure cylinder 28. The piston 29 in said cylinder is forced upward, causing upward movement of the pilot valve head 19 whereby the latter resumes its original position. Thus, the modulating cylinder 41 with its piston 42 under the conditions just described represents an auxiliary means for forcing or pumping actuating fluid into the conduit 34 in response to movement of the hydraulic motor to accelerate the building-up of pressure in the presssure cylinder 28, that is, to increase the resistance to flow through the discharge conduit 34 of said pressure cylinder.

What I claim as new and desire to secure by Letters Patent of the United States, is:

1. In a control system, the combination of a regulated element, a motor for moving the regulated element, a control member for the motor, a lever mechanism connected to the control member, a regulating element connected to the lever mechanism for varying the position of the control member, means for restoring the control member to its original position including means for biasing the control member in one direction and another means having a variable resistance for counteracting the first named biasing means and acting on the control member in opposite direction, means for varying the resistance of the other means in response to motor movement, and auxiliary means connected to the last named means for accelerating the restoring of the control member to its original position in response to motor movement.

2. In a control system, the combination of a regulated element, a motor for moving it, a control member for the motor, a lever mechanism connected to the control member, a regulating element connected to the lever mechanism for directly controlling the position of the control member, and means for restoring the control member to its original position, the restoring means including a conduit for receiving fluid at fixed pressure, a valve means connected to the motor for varying the resistance to flow of fluid through the conduit in response to motor movement, means connected to the control member for moving the control member in response to changes in fluid pressure in the conduit, and means for accelerating the action of the last named means in response to movement of the motor comprising a modulating cylinder communicating with the conduit and a piston in said cylinder connected to the valve means.

3. In a control system, a floating lever, a regulating element for moving the lever, a regulated element, means for moving the regulated element in response to movement of the regulating element, said means comprising a hydraulic motor connected to the regulated element, a pilot valve for the motor connected to the lever and means for restoring the pilot valve in terms of movement of the hydraulic motor comprising a pressure cylinder having a piston connected to the floating lever permitting the pilot valve to assume its line to line position at any position of said piston, spring means for biasing the piston in one direction and fluid under pressure acting on the piston in a direction opposed to that of the spring means, means for varying the fluid pressure acting on the piston in terms of movement of the hydraulic motor, and auxiliary means for accelerating the action of the last named means comprising a modulating cylinder communicating with the pressure cylinder and including a piston connected to the fluid pressure varying means.

R. WAYNE McLAUGHLIN.